United States Patent
Fixemer

Patent Number: 5,924,746
Date of Patent: Jul. 20, 1999

[54] RAPID COUPLING

[75] Inventor: Andreas Fixemer, Baden-Baden, Germany

[73] Assignee: Trinova GmbH, Germany

[21] Appl. No.: 08/856,636

[22] Filed: May 9, 1997

[30] Foreign Application Priority Data

May 10, 1996 [DE] Germany .................. 196 19 026

[51] Int. Cl.⁶ .................................................. F16L 37/00
[52] U.S. Cl. .................................................. 285/93; 285/319
[58] Field of Search .......................... 285/93, 319, 921, 285/24, 27

[56] References Cited

U.S. PATENT DOCUMENTS

| | | | |
|---|---|---|---|
| 2,420,858 | 5/1947 | Brownell | 285/174 |
| 4,753,458 | 6/1988 | Case et al. | 285/39 |
| 4,786,085 | 11/1988 | Sauer et al. | 285/24 |
| 4,834,423 | 5/1989 | DeLand | 285/39 |
| 4,895,396 | 1/1990 | Washizu | 285/93 |
| 4,913,467 | 4/1990 | Washizu | 285/39 |
| 4,923,228 | 5/1990 | Laipply | 285/319 |
| 5,375,892 | 12/1994 | Keuper et al. | 285/319 |

*Primary Examiner*—Anthony Knight
*Assistant Examiner*—Gary Grafel
*Attorney, Agent, or Firm*—Ostrolenk, Faber, Gerb & Soffen, LLP

[57] ABSTRACT

A rapid coupling, having a socket and a nipple which can be inserted into the socket. A locking device for the coupled position between the socket and nipple includes a radially outwardly protruding bead on the nipple. A cage mounted in the socket includes widenable holding fingers for gripping behind the bead on the nipple. The cage has an indicating device which includes radially outwardly displaceable, axially extending arms. The ends of those arms have a nose that can be seen and/or felt from the outside of the socket in the coupled position. A connection at the other end of the socket to a pipeline.

12 Claims, 5 Drawing Sheets

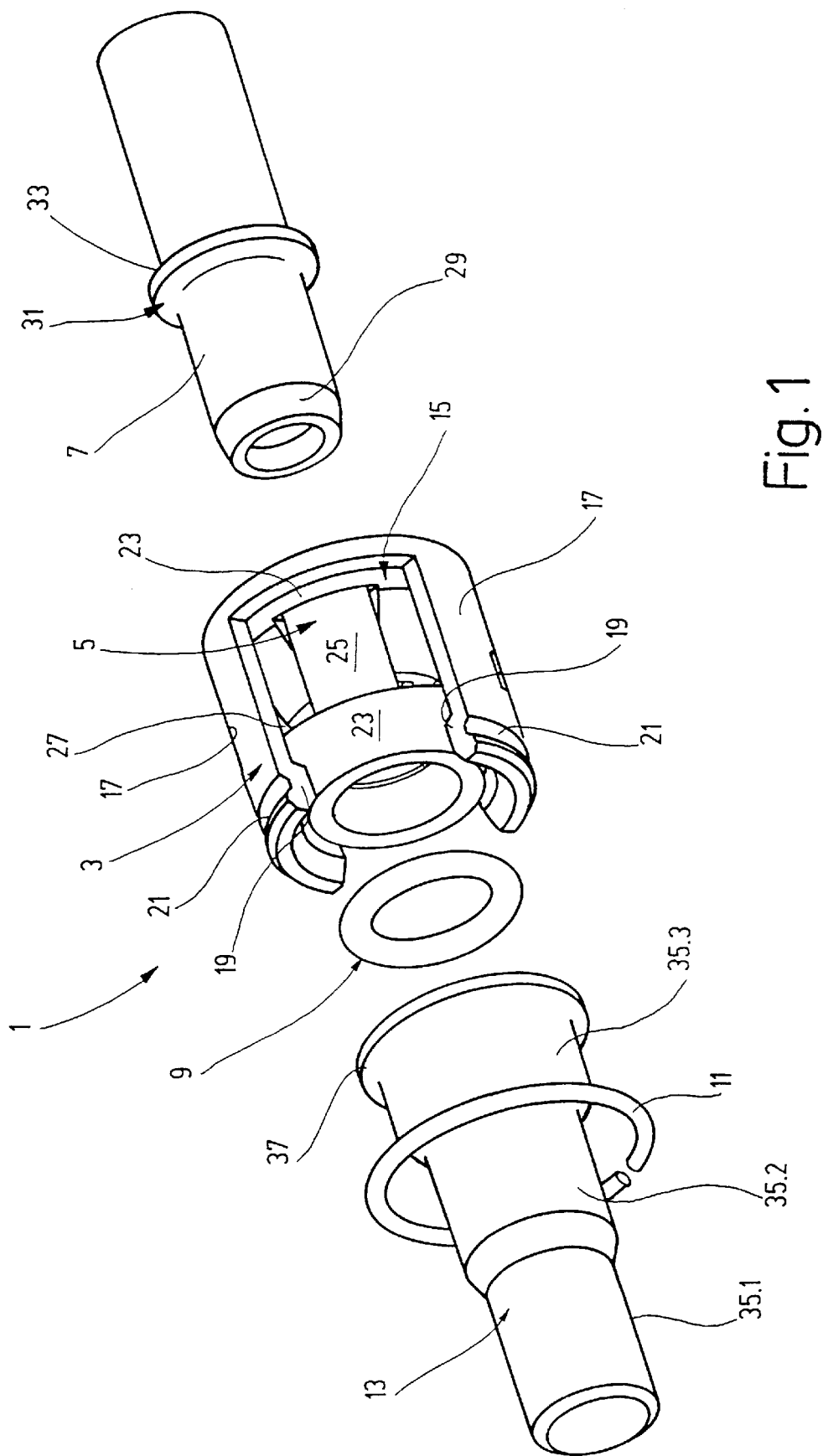

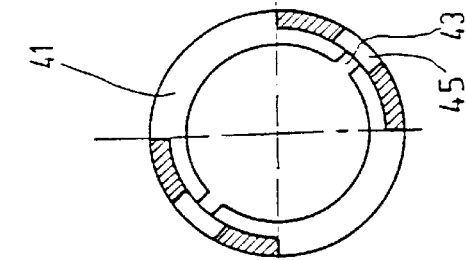
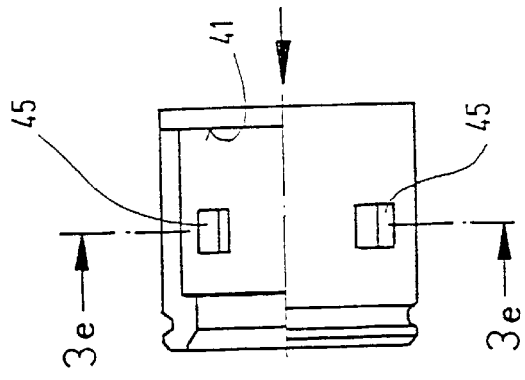
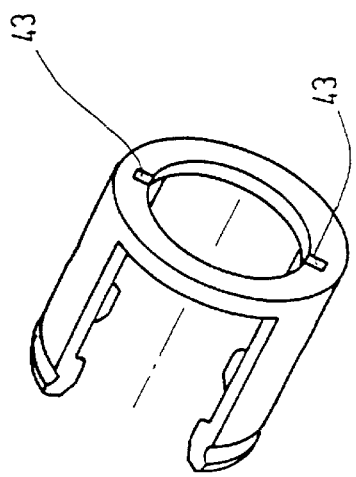
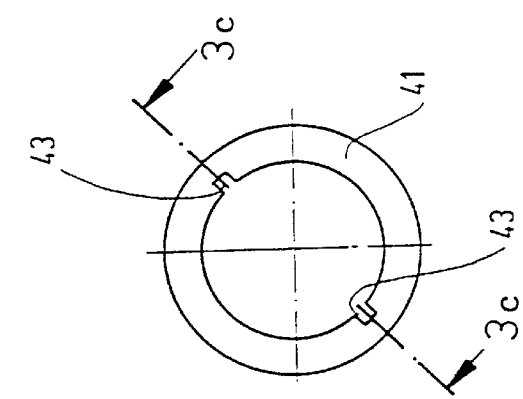
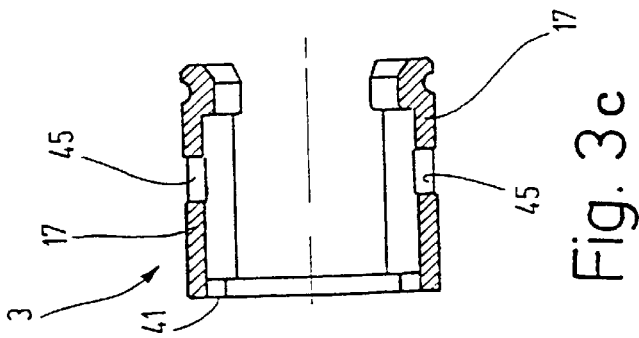

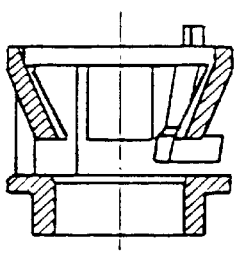
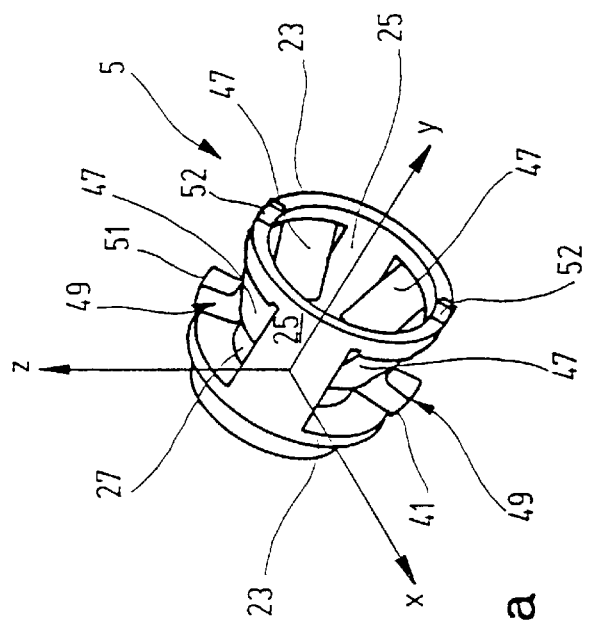
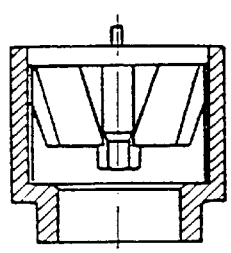
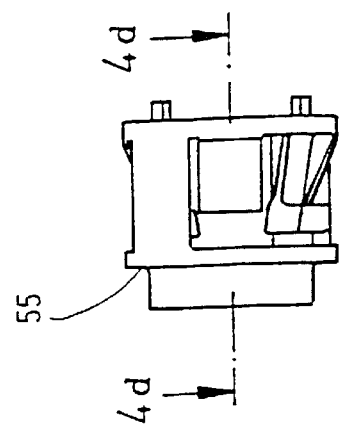
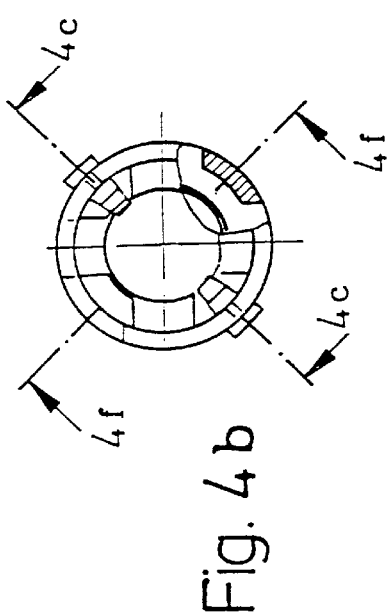
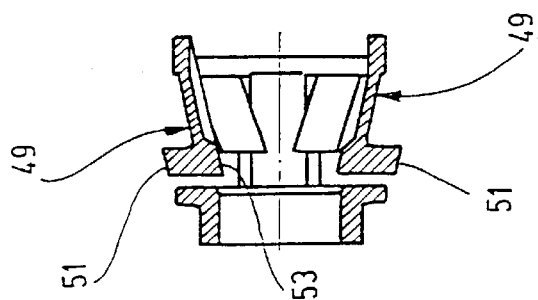

RAPID COUPLING

BACKGROUND OF THE INVENTION

The present invention relates to a rapid coupling, particularly for refrigerant lines but not restricted to such use. The coupling has a socket and a nipple which can be inserted into it. It includes a locking device for the locking the coupled position between the socket and the nipple. That device has a bead protruding radially outward on the nipple. A cage mounted in the socket includes expandable holding fingers which grip behind the inserted bead.

A rapid coupling of this type is known, for instance, from U.S. Pat. No. 4,923,228. The socket of that rapid coupling has spring fingers which cooperate with a shoulder arranged on the nipple and which hold the two parts together in coupled position.

The disadvantage of such rapid couplings is, in particular, that the mechanic who assembles the two parts cannot see whether the two parts are completely coupled. An incomplete connection causes a leak during operation.

Known rapid couplings are particularly disadvantageous when they are used in places which are not visible to the mechanic. This frequently occurs in automobile construction, where the rapid couplings are concealed from the mechanic, for instance, by parts of the engine. It is difficult for the mechanic using the sense of feel (his hands) to determine whether the two coupling parts are properly assembled. There is also a great danger that, due to a defective connection, a leak will occur which might later lead to loss of refrigerant during operation.

SUMMARY OF THE INVENTION

The object of the present invention is therefore to provide a rapid coupling which indicates to the mechanic whether the two parts of the coupling are properly inserted into each other.

This object is achieved by a rapid coupling having a socket and a nipple which can be inserted into the socket. A locking device for the coupled position between the socket and nipple includes a radially outwardly protruding bead on the nipple. A cage mounted in the socket includes widenable holding fingers for gripping behind the bead on the nipple. The cage has an indicating device comprising a radially outwardly displaceable, axially extending arm. The end of that arm can be seen and/or felt from the outside of the socket in the coupled position. Because an indicating device indicates correct coupling in a manner which can be seen and felt, defective coupling can be avoided. In particular, the indicating device has an axially extending arm which can be displaced radially outwardly such that the end of the arm in its coupled position is shifted visibly toward the outside. The visible end is preferably colored so that it stands out optically from the surroundings. In addition, the end is raised somewhat above the outer surface of the socket so that the mechanic is also able to feel the end.

It is particularly advantageous if the arm of the indicating device is pressed outward by the bead on the nipple in the coupled position. In this case, previously used nipples can be used further without change.

One particularly simple construction comprises an indicating arm which includes one end having a radially outwardly projecting nose which engages through a hole provided in the socket in the coupled position. In addition to its simple construction, this embodiment also has the advantage that the outwardly extending nose can be very easily felt since there is a smooth surrounding surface directly around it.

For simple construction, use of a cage is advantageous. The cage is comprised of two axially separated rings which are connected to each other by at least two axially extending webs. The axially extending indicating device arm, which extends from the ring facing the nipple, extends axially obliquely in the direction toward the other ring. By suitable selection of the material, radial displaceability of the indicating device arm can be very easily obtained.

Provision of two indicating device arms located circumferentially opposite each other has been found particularly advantageous. This assures that at least one arm can be felt in the coupled position by the mechanic, even if the rapid coupling lies at a place which is accessible only with difficultly.

A very simple connection between the socket and a pipeline can be provided wherein the end section of the socket which faces away from the nipple is developed so that it can be widened and it also includes a radially inwardly protruding bead. If the end of the pipeline is provided with a radially outwardly extending rim, the connection between the socket and the pipeline can be obtained by merely inserting the end of the pipeline into the socket. In the inserted condition, the inwardly protruding bead cooperates in a form locked manner with the radially outwardly extending rim of the pipeline.

An annular groove on the outer circumferential surface of the end section of the socket and a locking ring which can be inserted thereon, prevents the widenable end of the socket from widening and thereby prevents the socket from sliding off the pipeline in simple manner.

In order to prevent the cage from turning in the socket, and particularly so that the cage is correctly positioned with respect to the socket, at least two projections provided on a ring of the cage cooperate with at least two recesses in the socket. The advantage here also resides, in particular, in the simple construction of this twist proof lock and positioning unit.

Other features and advantages of the present invention will become apparent from the following description of the invention which refers to the accompanying drawings.

BRIEF DESCRIPTION OF THE DRAWINGS

FIG. 1 is an exploded view of a rapid coupling according to the invention;

FIG. 3a is a perspective view of the socket;

FIG. 3b is an end view thereof;

FIG. 3c is a section at 3c through FIG. 3b;

FIG. 3d is a side view, partially sectioned;

FIG. 3e is a section at 3e through FIG. 3d;

FIG. 4a is a perspective view of the cage;

FIG. 4b is one end view thereof;

FIG. 4c is a section at 4c of FIG. 4b;

FIG. 4d is a section at 4d of FIG. 4e;

FIG. 4e is a side view;

FIG. 4f is a section at 4f of FIG. 4b;

DETAILED DESCRIPTION OF THE INVENTION

Figure 2A:
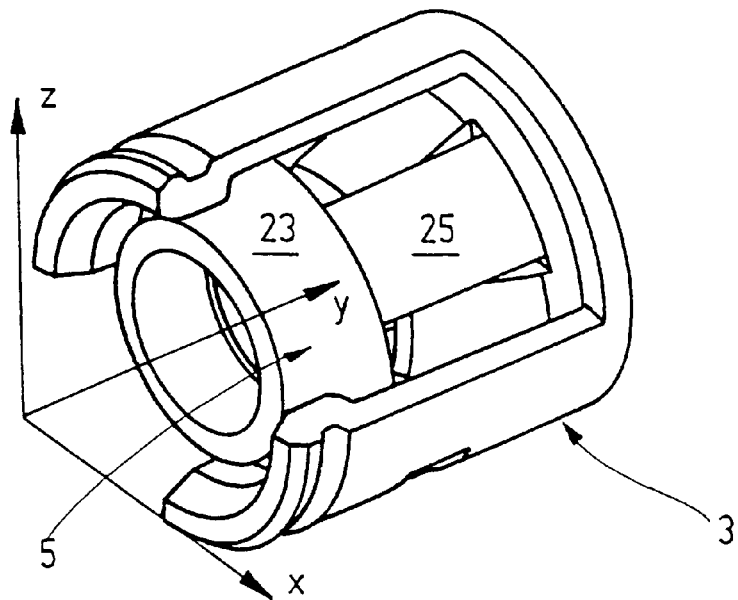
FIG. 2a is a front perspective view of a socket with an inserted cage.

A rapid coupling 1, as shown in FIG. 1, comprises a hollow cylindrical socket 3, a hollow cage 5, which is also cylindrical and is disposed inside the interior of the socket, and a cylindrical nipple 7 from one pipe end to be coupled and which is insertable into the cage. Furthermore, there are a gasket 9, a locking ring 11, and a portion of a pipeline 13 to which the coupling is coupled.

The socket 3 has two circumferentially wide slits 15 which open at the axial edge at one end. These form longitudinal sections 17 of the socket, and the sections are connected to each other at the opposite end of the socket. The two slits 15 enable the two longitudinal sections 17 to be displaceable radially at the open edge end when a resilient material is used for the socket.

The open-edge ends of the two longitudinal sections 17 have beads 19 which extend circumferentially and also radially toward the inside. In the region of each bead 19, on the outside of the longitudinal sections 17, there is a groove 21 which also extends circumferentially and is designed to receive a locking ring 11.

The outside diameter of the cage 5 is smaller than the inside diameter of the socket 3. The cage is inserted into the socket 3. The cage 5 and the socket 3 can also be made as a single unit. The cage 5 is comprised essentially of two axial end rings 23 which are connected to each other by a plurality of axially extending webs 25. The webs 25, which are spaced apart circumferentially and extend parallel to the axis, thus form substantially rectangular recesses 27 in the cage. More detailed descriptions of the socket 3 and of the cage 5 are provided later with reference to FIGS. 2 to 4.

FIG. 1 further shows that the tubular nipple 7 has a frustoconical end section 29 which is intended to facilitate its insertion into the socket 3 or the cage 5. At a distance from its end section 29, the nipple 7 has an annular, radially outwardly protruding bead 31. The side 33 of the bead facing away from the end section 29 extends substantially radially.

The diameter of the bead 31 is somewhat smaller than the inside diameter of the ring 23 of the cage 5. This assures that the nipple 7 can be inserted together with the bead 31 into the cage 5.

In the embodiment shown, the pipeline 13 is provided with three longitudinal sections 35.1, 35.2 and 35.3 having outside diameters which increase in the direction toward the socket 3 so that the longitudinal section 35.3 has the largest diameter.

The axial edge of the longitudinal section 35.3 is beaded so as to produce a flange like end 37. The outside diameter of this flange like end 37 is selected to correspond approximately to the inside diameter of the socket 3 behind the bead 19 i.e., on the side of the bead away from the pipeline.

Furthermore, the inside diameter of the longitudinal section 35.3 and the outside diameter of the ring 23 of the cage 5 which faces the section 35.3 are so designed so that the ring 23 can be inserted into the pipeline 13, and at least into the longitudinal section 35.3. The gasket 9 shown in FIG. 1 also has an outside diameter which makes it possible to insert the ring 9 into the longitudinal section 35.3.

FIG. 2 shows, again in an enlarged view, and from two different opposite perspectives, the socket 3 with the inserted cage 5. As identical reference numerals are used here for identical parts, the description of the parts is not repeated.

Figure 2B:
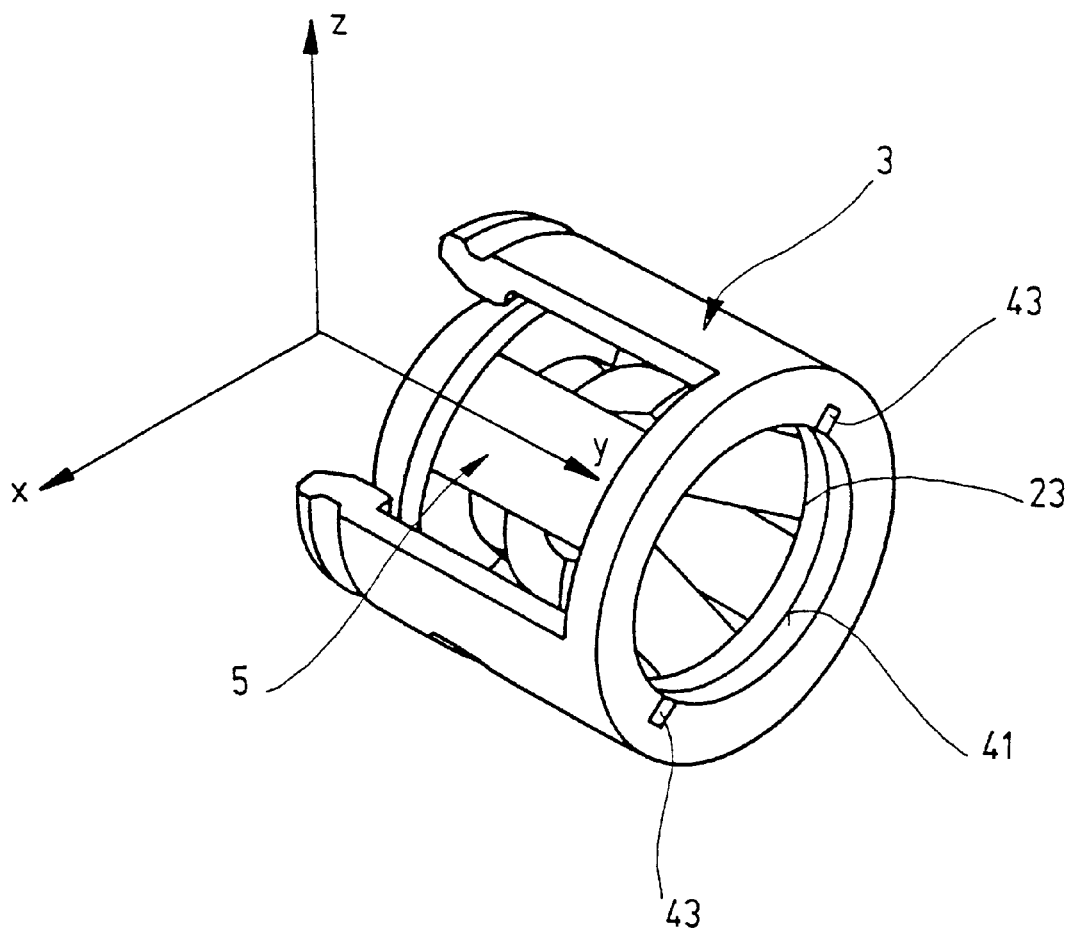
FIG. 2b is a rear perspective view thereof.

The rear perspective view of FIG. 2b clearly shows the ring 23 resting against an inwardly directed stop surface 41 on the socket 3. The stop surface 41 is intended to prevent the cage 5 from dropping out the rear end of the socket 3. FIG. 2b also shows two short circumferential width, open-edge recesses 43 which lie opposite each other and which extend from the outside of the socket 3 up to the cage 5 resting against the stop surface 41.

These recesses 43 are again shown very clearly in the detailed showings of the socket 3 contained in FIGS. 3. In FIGS. 3 each of the longitudinal sections 17 of the socket 3 has an opening 45 which extends radially through the wall and is of rectangular shape in top view.

FIGS. 4 show the cage 5 in detail. The perspective view shows holding fingers 47 that start from one of the two rings 23 and extend into the recesses 27. Two holding fingers 47 present per recess are illustrated. They extend obliquely inwards whereby they narrow the inside diameter. These holding fingers can also be moved radially outwards, which is made possible, for instance, by the use of a resilient material for the cage.

An arm 49 is disposed between every two holding fingers 47 of a recess 27. The arm 49 also extends obliquely inward, extending from the ring 23. On the end of the arm there is a nose 51 of rectangular shape, as seen in top view, and which extends radially outward. The arm 49 with the nose 51 is connected in a radially displaceable manner with the ring 23. Alongside its radial extension towards the outside, the nose 51 also has a section 53 which extends inwards, starting from the inner side of the arm 59.

FIGS. 4 also show positioning noses 52 which are arranged on the rear ring 23 of the cage and extend axially. They are dimensioned so that they can engage into the recesses 43 in the socket 3.

Figure 5A:
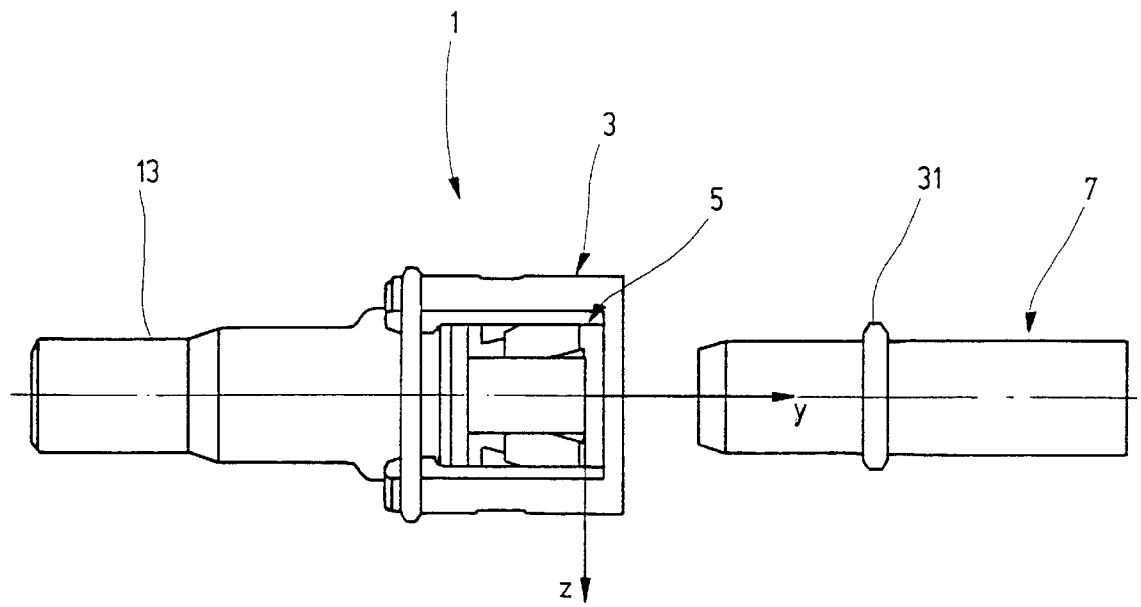
FIG. 5a is a partially disassembled side view of the coupling.

Operation of the rapid coupling 1 is explained with reference to FIGS. 5.

The cage 5 is first pushed into the socket 3 until it strikes against the stop surface 41. In this connection, the positioning noses 52 must engage into the recesses 43 in order to obtain the desired positioning. Thereupon, the unit comprised of the socket 3 and the cage 5 is connected to the pipeline 13, particularly the longitudinal section 35.3, until a stop surface 55 of the ring 23 comes against the flange like end 37.

When the socket 3 is pushed onto the pipeline 13, the longitudinal sections 17 are radially widened by cooperation of the bead 19 with the flange like end 37. In the end position, however, the flange like end 37 grips behind the bead 19 and the sections 17 return inwardly so that it is no longer possible to pull the socket 3 off. In order to prevent subsequent radial widening of the two longitudinal sections 17, the lock ring 11 is inserted into the corresponding groove 21 around the sections 17. A plastic ring or a steel clamp rather than the locking ring 11 may, of course, be used. Axial displacement of the socket 3 with the cage 5 is therefore prevented by the interaction of the bead 19 and the stop surface 55. In another embodiment (not shown), the socket 3 along with the cage 5 are connected in a non-detachable manner to the pipeline, for instance by soldering or bonding.

Next, the nipple 7 is inserted into the unit comprised of the socket 3 and the cage 5. The bead 31 around the nipple comes into contact with the holding fingers 47 and presses them radially outwardly. After the bead 31 has been moved in past the holding fingers 47, the fingers swing back inwardly and making it impossible for the nipple 7 to be pulled out again. Excessively deep penetration of the nipple 7 is prevented by the ring 23 of the cage, which serves as a stop for the bead 31.

Figure 5B:
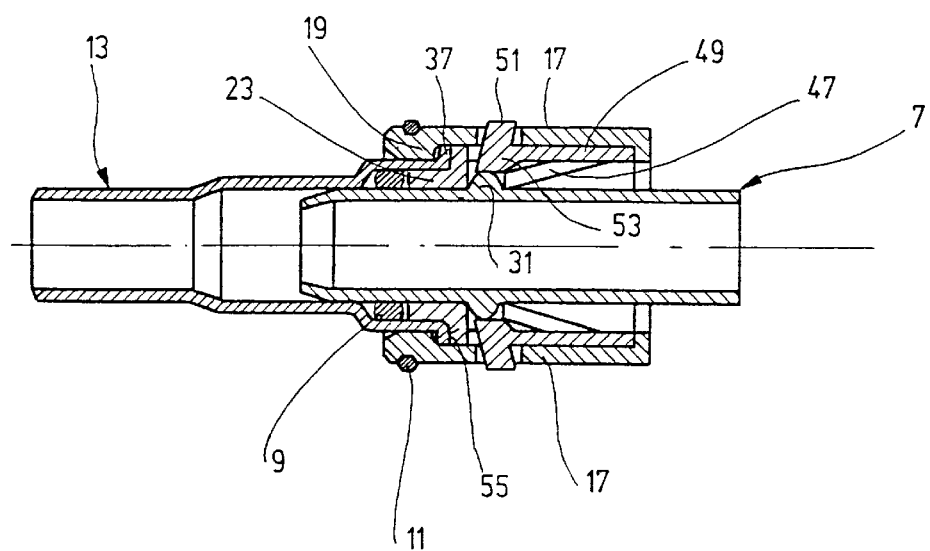
FIG. 5b is a cross section through the rapid coupling in its coupled condition.

In FIG. 5b, the bead 31 cooperates with the inwardly extending projection 53 of the arm 49 and thus presses the noses 51 radially outward. By corresponding relative positioning of the socket 3 and the cage 5, which is effected by interaction of the recesses 43 and the positioning noses 52, the two openings 45 of the socket 3 lie directly over the respective noses 51 of the cage 5. In the coupled condition, the bead 31 of the nipple thus presses the noses 51 outward far enough to pass through the openings 45 to protrude somewhat with reference to the surrounding surface of the socket 3.

If the outer surfaces of the noses 51 are colored, the mechanic is then able to recognize a proper completed coupling optically by means of the noses 51. Should the coupling 1 not be visible, the protruding noses 51 can be easily felt.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A rapid coupling for a fluid line comprising:

a hollow socket;

a hollow cage disposed in the socket, the cage having holding fingers which are normally oriented radially inwardly but which are movable radially outwardly;

a nipple insertable into one end of the socket and into the cage in the socket;

a radially outwardly protruding locking bead around the nipple, the bead being shaped for engaging the fingers of the cage as the nipple is inserted into the cage and the bead being positioned on the nipple so as to pass the holding fingers which then move radially inwardly behind the bead of the inserted nipple for preventing extraction of the nipple from the cage; and an indicating device on the cage including a radially outwardly displaceable arm which is displaceable outwardly of the cage and the socket and extends axially, is supported on the cage and has an end that is spaced from the support on the cage, the end of the arm being shaped so as to be seen and/or felt at the radial outside of the socket, the end of the axially extending indicating device arm includes a radially outwardly protruding indicator nose, the indicating device being placed with respect to the nipple for enabling the indicating device to be seen and/or felt from the outside of the socket when the nipple is installed in the cage with the fingers of the cage, behind the bead, wherein the socket has a respective opening at each of the radially protruding indicator noses of each of the axially extending arms such that with the nipple fully installed in the coupled position, the indicator noses protrude through the respective openings in the socket, and the bead on the nipple is positioned to engage and to displace outwardly the indicating device arm when the nipple is fully installed and in the coupled position.

2. The coupling of claim 1, wherein the holding fingers of the cage are obliquely inclined radially inwardly of the cage and are inwardly inclined along the direction of insertion of the nipple into the cage.

3. The coupling of claim 1, wherein the cage is comprised of two axially separated rings and of at least two circumferentially separated, axially extending webs connecting the rings of the cage; the fingers of the cage extending from one of the rings.

4. The coupling of claim 3, wherein the fingers and the axially extending indicating device arm both extend from that one cage ring of the two rings that faces the nipple.

5. The coupling of claim 4, wherein there are two circumferentially opposite ones of the axially extending arms of the indicating device.

6. The coupling of claim 1, wherein the socket has an end section facing away from the nipple which is expandable and which supports a radially inwardly projecting bead.

7. The coupling of claim 6, wherein the end section of the socket includes an annular groove; and a locking ring insertable into the groove for holding the end section of the socket against radially outward expansion.

8. The coupling of claim 4, wherein the end of the axially extending indicating device arm includes a radially outwardly protruding indicator nose;

the socket having a respective opening at each of the radially protruding indicator noses of each of the axially extending arms such that with the nipple fully installed in the coupled position, the indicator noses protrude through the respective openings in the socket.

9. The coupling of claim 8, wherein the one ring of the cage which faces the nipple includes two axially protruding positioning noses; corresponding recesses in the socket are positioned for receiving the positioning noses of the cage, for in turn positioning the indicator noses of the indicating device arms so that the indicator noses lie in the respective regions of the openings in the socket.

10. The coupling of claim 1, wherein the socket and cage are a single unit.

11. The coupling of claim 1, further comprising a pipeline to be received in the socket at the opposite side of the socket from the nipple; the pipeline including a flange, and the socket including means for gripping the flange of the pipeline for coupling the pipeline to the socket.

12. The coupling of claim 1, further comprising a pipeline to be received in the socket at the opposite side of the socket from the nipple; the pipeline including a flange and the socket including means for gripping the flange of the pipeline for coupling the pipeline to the socket, wherein the flange of the pipeline is shaped for being held in the socket by the radially inwardly projecting bead thereof.

* * * * *